(12) United States Patent
Stove

(10) Patent No.: US 7,710,315 B2
(45) Date of Patent: May 4, 2010

(54) RADAR APPARATUS

(75) Inventor: Andrew Gerald Stove, Hove (GB)

(73) Assignee: Thales Holdings UK PLC (GB)

( * ) Notice: Subject to any disclaimer, the term of this patent is extended or adjusted under 35 U.S.C. 154(b) by 116 days.

(21) Appl. No.: 11/673,851

(22) Filed: Feb. 12, 2007

(65) Prior Publication Data

US 2007/0194983 A1 Aug. 23, 2007

(30) Foreign Application Priority Data

Feb. 13, 2006 (GB) ................................. 0602850.0

(51) Int. Cl.
*G01S 7/04* (2006.01)
(52) U.S. Cl. ........................ 342/185; 342/195; 342/93
(58) Field of Classification Search .................... 342/90
See application file for complete search history.

(56) References Cited

U.S. PATENT DOCUMENTS 4,851,850 A * 7/1989 Milan et al. ................... 342/90

5,107,270 A 4/1992 Waters

FOREIGN PATENT DOCUMENTS

WO WO 2004/068163 * 8/2004

* cited by examiner

*Primary Examiner*—Thomas H Tarcza
*Assistant Examiner*—Timothy A Brainard
(74) *Attorney, Agent, or Firm*—Lowe Hauptman Ham & Berner, LLP

(57) ABSTRACT

A scan-to-scan integrator for use in radar apparatus comprises means for defining a search window for use in verifying a candidate detection. The window is bounded by the intersection of a first zone and a second zone, wherein the first zone comprises a rectangular reference frame aligned detection window, and the second zone comprises a range estimate tolerance region defined by a range estimate for the candidate detection and predetermined tolerance limits.

10 Claims, 4 Drawing Sheets

RADAR APPARATUS

RELATED APPLICATIONS

The present application is based on, and claims priority from, United Kingdom Application Number 0602850.0, filed Feb. 13, 2006, the disclosure of which is hereby incorporated by reference herein in its entirety.

The present invention relates to radar apparatus, and particularly to a scan-to-scan integrator for such a radar apparatus.

A scan-to-scan integrator is used to correlate detections on successive scans of a radar antenna to reduce false alarm rates. In many cases, it is not possible to declare reliably targets for display on the basis of merely one scan of a radar antenna. Due to noise, interference and other factors, artifacts on a received signal may not necessarily correspond to an object in the detected environment. Therefore, it is known to provide a scan-to-scan integrator, which determines, on the basis of several scans, whether a detected artifact is more likely due to the existence of a target of interest or to a more transient phenomenon.

When a detection is found on a first scan, the likely position of the detection when encountered on the next scan is estimated, and a detection in that area on the next scan is then integrated with the first one. Generally, the operator will determine the number N of scans over which this integration will be performed and, on the basis of this number N, the radar apparatus will determine a suitable threshold M of positive assessments of the candidate detection. M will be typically set to approximately N/2.

The beam width achieved by a radar antenna is finite, giving rise to uncertainty in the cross-range position of a target. That is, the angular position of the target relative to a reference polar axis cannot be determined on one scan to a high degree of accuracy. Relative to this, the range, or radial position, of a target can be determined with greater accuracy. Thus, the 'ideal' scan zone for scan to scan integration is an arcuate lozenge shape, as illustrated in FIG. 4.

FIG. 4 illustrates a radar antenna 12 with a nominal scan sector marked by solid lines R1, R2. A centre line is also marked for clarity. The grey lozenge represents the area of greatest certainty after one scan as to the likely position (or indeed, presence) of a target detection. Other features of FIG. 4 will be described in due course with regard to the present invention.

A radar apparatus requiring scan-to-scan integration is usually operated by means of Cartesian coordinates, rather than polar coordinates. This is entirely due to computational simplicity since, taking account of motion of the radar apparatus (such as when implemented on a ship, or an aeroplane) or the targets themselves, in the radar's 'natural' polar frame would be highly computationally intensive. Thus, the Cartesian frame of reference is preferred as this can be used more effectively to compensate for detector and target motion.

By adopting the Cartesian frame, the search window is necessarily defined in Cartesian coordinates. Previous approaches to defining a search window have focused on determining a rectangular search window aligned with the Cartesian frame of reference. Such a search window is indicated by broken lines W1 in FIG. 4, bounding the ideal zone. The disadvantage with this is that, for targets detected in directions away from the axes of the Cartesian frame, the rectangular search window must be much larger in area than the ideal window, and this increases the probability that false alarms will be correlated and thus erroneous integrated plots will be displayed.

According to one aspect of the invention, a scan-to-scan integrator for use in radar apparatus comprises means for defining a search window for use in verifying a candidate detection, the window being bounded by the intersection of a first zone and a second zone, the first zone comprising a rectangular reference frame aligned detection window, and the second zone comprising a range estimate tolerance region defined by a range estimate for the candidate detection and predetermined tolerance limits.

According to a second aspect of the invention, a method is provided for integration of radar detection signals for presentation of radar detection output to a user, the method of integrating said signals comprising generating a radar detection output on the basis of successful verification of a candidate detection if said candidate detection is verified a number of times exceeding a threshold relative to a number of scans to be performed, the step of candidate detection further comprising the steps of defining a rectangular search window relative to a Cartesian reference frame within which to verify the candidate detection, determining a range window within which candidate detection is to be verified, and if the candidate detection is detected within the rectangular search window and within the range window, then verifying the candidate detection.

Preferably, the range estimate for a scan is determined from the position determined on the previous scan. It will be appreciated that when the process is first initialised, no window is used as there is not yet any 'previous' data with which to compare.

Further in a preferred embodiment, the range window is determined by increment and decrement of the range estimate by a predetermined tolerance.

Preferably, the first scan is preceded by initialisation of range estimates. This initialisation can comprise a preliminary scan.

Further features, advantages and aspects of the invention will be understood from the following description of a specific embodiment of the invention, with reference to the accompanying drawings. It will be understood that the described embodiment is provided by way of example only, and should not be viewed as determining limitation on the scope of the invention, which is defined by the appended claims.

Figure 1:
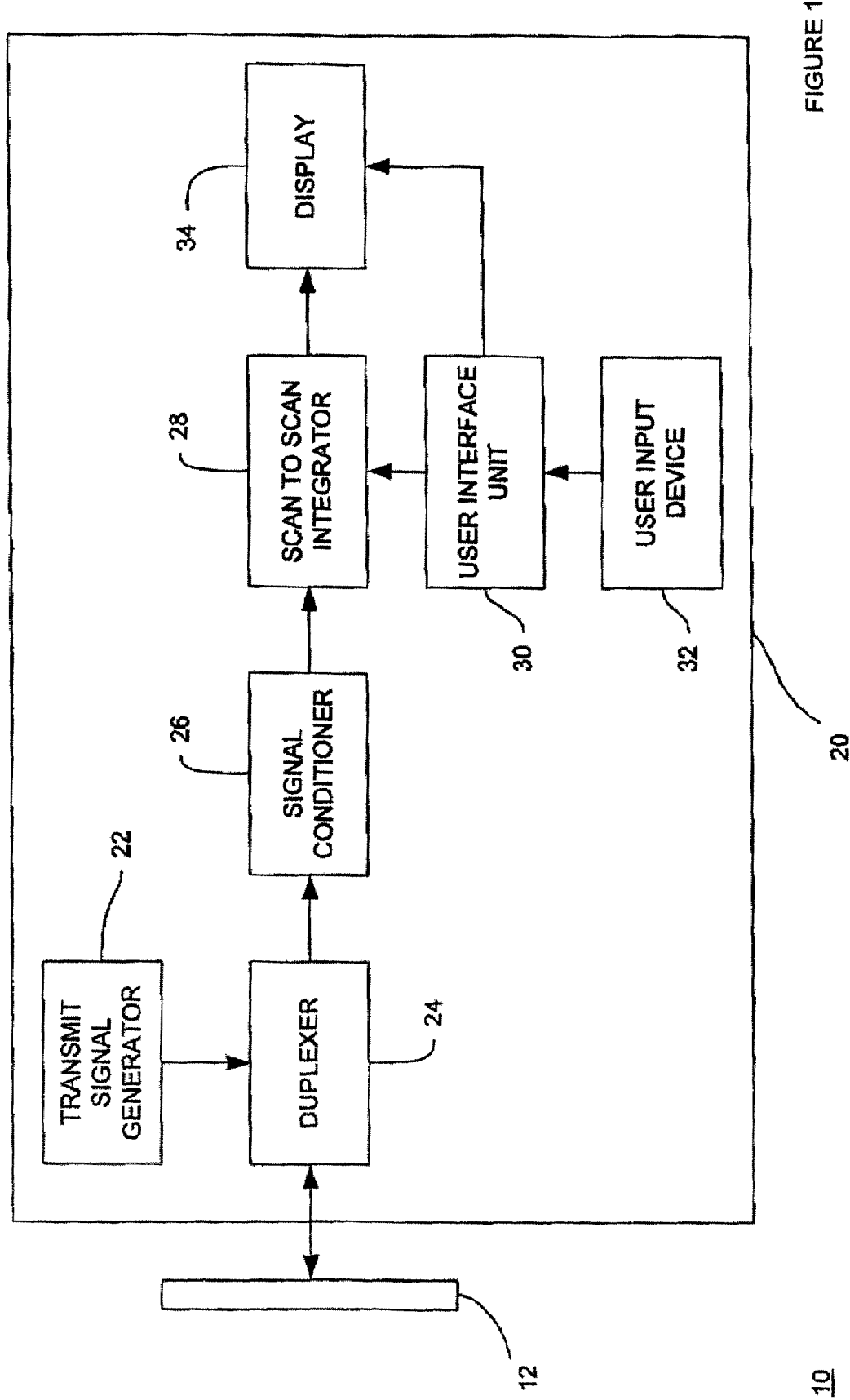
FIG. 1 is a schematic diagram of a general arrangement of a radar apparatus in accordance with a specific embodiment of the invention.

As illustrated in FIG. 1, a radar apparatus 10 comprises a rotatable radar antenna 12 and a radar detection unit 20. The radar detection unit comprises a transmit signal generator 22 operable to generate a signal to be used to generate radio transmission by means of the antenna 12, and a duplexer 24 operable to pass the transmit signal to the antenna 12 and also to detect and receive a received signal generated as a result of reception at the antenna of radio signals resultant from reflection of the transmitted waveform.

The signal received at the duplexer 24 is then passed to a signal conditioner 26, which comprises amplification and detection functionality such as is commonplace in existing radar apparatus. The conditioned signal is then passed to a scan-to-scan integrator 28. Operation of the scan-to-scan integrator is configured, at least in part, by means of user interface options provided by a user interface unit 30, which is operable to receive user input actions determined on a user input device 32. The user interface unit also offers options for configuration of a display 34. In operation, the scan-to-scan integrator outputs integrated signals to the display 34.

While radar apparatus such as in the described example can provide user operable controls, it is also possible for radar apparatus to be fully automatic and the present example is not intended to imply exclusion of such arrangements from the present invention.

Figure 2:
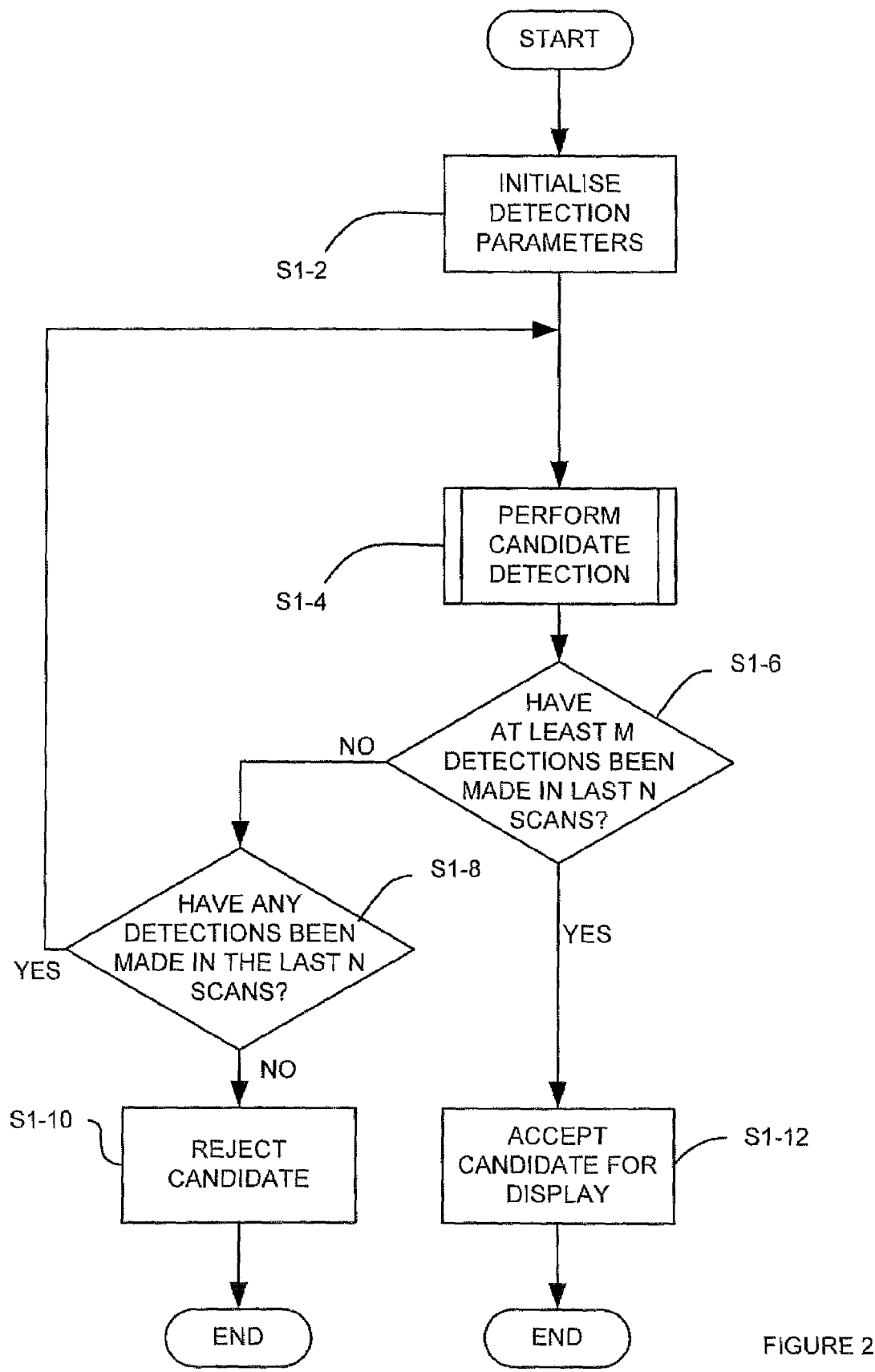
FIG. 2 is a flow diagram illustrating operation of the scan-to-scan integrator illustrated in FIG. 1.

In operation, in accordance with the specific embodiment, the scan-to-scan integrator operates in accordance with the flow diagram illustrated in FIG. 2. For simplicity, FIG. 2 illustrates a flow diagram for a process operable on a single candidate detection offers to the scan-to-scan integrator 28 by the signal conditioner 26. It would be appreciated that, in use, a plurality of separate candidate detections will be processed by the scan-to-scan integrator in parallel.

The process commences in step S1-2 by initialisation of detection parameters. This includes determining the number of scans N to be performed by the scan-to-scan integrator in respect of a single candidate detection. This is, in one embodiment, performed by offering to a user of the radar apparatus 20, the facility to select the number of scans. Clearly, the more scans that are used by the scan-to-scan integrator, the greater the degree of certainty as to the validity of data displayed by the apparatus, while fewer scans will produce display more quickly.

Further, an initial range estimate for the candidate detection is determined in step S1-2. This will be used in later steps of the process performed by the scan-to-scan integrator 28 which will be described in due course.

Then, in step S1-4, a candidate detection process is performed, as will be described in due course with reference to FIG. 3. The candidate detection process provides a log of the number of positive detections of a candidate detection in a predetermined number of attempts.

In step S1-6, the process considers if the number of positive detections in the last N scans is at least a threshold M determined in the initialisation step S1-2. If this is the case then the candidate is accepted for display in step S1-14. Otherwise, a further consideration is made in step S1-8 as to whether the candidate detection has been found at all in the last N scans. If no detections have been made, then the process rejects the candidate detection, in step S1-10. However, if the candidate detection has been found in the last N scans (but obviously not on sufficient occasions as to warrant acceptance for display) then the candidate is resubmitted for detection in step S1-4.

Figure 3:
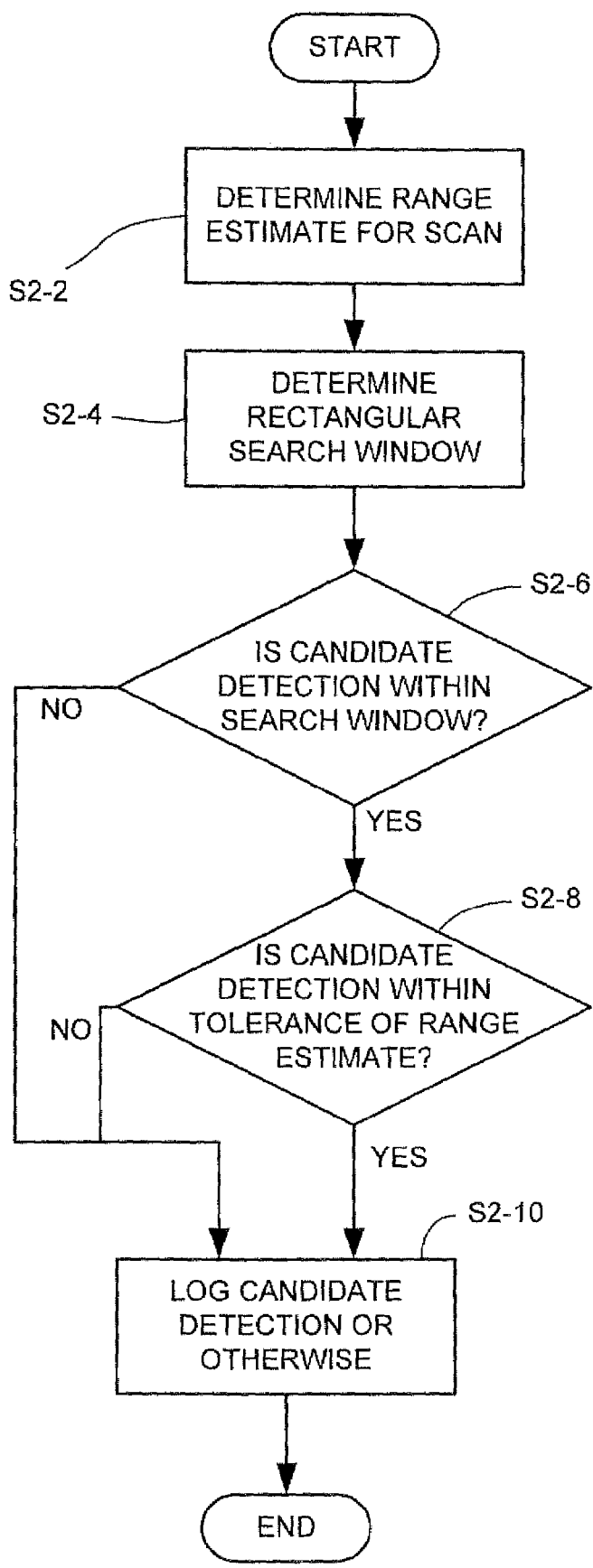
FIG. 3 is a flow diagram of a "integrate candidate detection" process in the flow diagram illustrated in FIG. 2.

FIG. 3 illustrates a process of integrating a candidate detection over a particular scan. The process received information concerning the previous scan, or initialisation information in the case of a first scan. In a first step, step S2-2, a range estimate is determined for the scan, on the basis of the information concerning the previous scan or on the basis of the initialisation information. In step S2-4, a rectangular search window is determined, the search window being parallel with the Cartesian coordinate axes on the basis of which the radar apparatus is operating. Then, a first determination step S2-6 determines whether the candidate detection is within the search window. If not, then in accordance with conventional procedures, the candidate is noted as not having been detected for that scan and the scan ends. Otherwise, in step S2-8, the process determines whether the candidate detection is within a predetermined tolerance of a range estimate previously determined for the candidate. Again, if this determination finds that the candidate is not within the desired range, then the candidate is noted as not being present.

If both of these determinations find that the candidate detection is within the two search windows, then a candidate detection is noted. In step S2-8 a candidate detection (or the absence of such on this scan) is noted in a candidate detection log. The process then ends and returns to the main process illustrated in FIG. 2.

Figure 4:
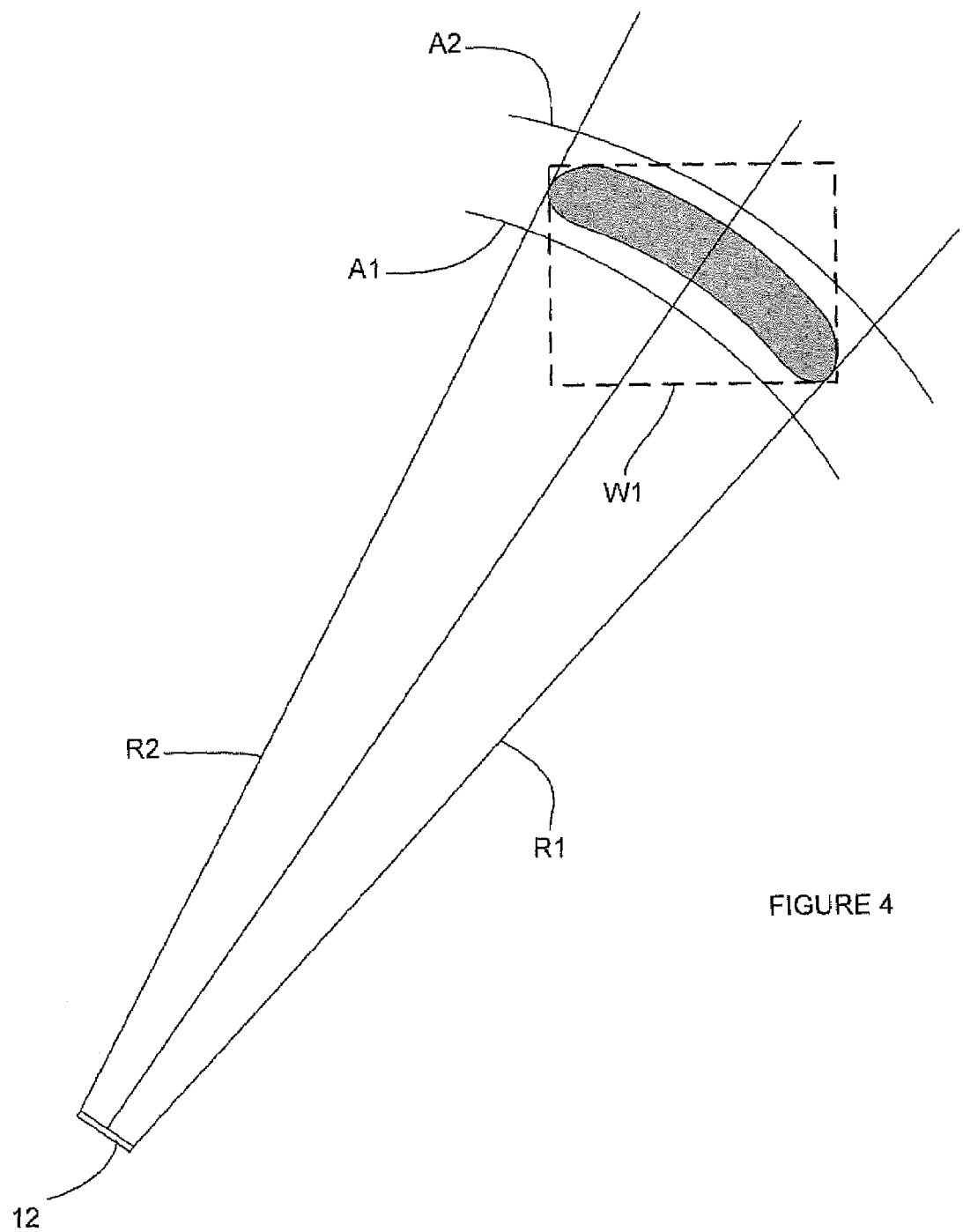
FIG. 4 illustrates the scan window resultant from use of the described embodiment, as compared with the ideal scan window with respect to known tolerances of detection.

FIG. 4 illustrates operation of the present invention in further detail. In particular, the ideal zone (the grey zone illustrated in FIG. 4) is now bounded not only by the rectangular window as described above, but also by an arcuate window defined by the arcs A1, A2. Therefore, a smaller zone for confirmation of target detection is provided. This will consequently significantly reduce the prospect of false positive readings.

Whereas a rotating radar antenna has been implemented in the described embodiment, it will be appreciated that the invention can also be applied to electronically scanned (phased array) radar apparatus, where the antenna does not physically rotate and wherein the updates of the data may be irregular. The invention does not depend upon regularly periodically updating data for its implementation.

Further features, aspects and advantages of the present invention will be understood from the foregoing as read by the skilled person, who will appreciate that the foregoing description of a specific embodiment is intended to illustrate a preferred implementation of the invention and is not intended to limit the scope of protection afforded thereto, the latter being defined by means of the claims which are appended.

The invention claimed is:

1. A scan-to-scan integrator for use in radar apparatus, comprising:
    window defining means for defining a search window for use in verifying a candidate detection, the window being bounded by an intersection of a first zone and a second zone so as to be smaller than the first and the second zone, the first zone comprising a rectangular detection window relative to a Cartesian reference frame, and the second zone comprising a range estimate tolerance region defined by a range estimate for the candidate detection and predetermined tolerance limits, this second zone being bounded by arcuate bounds centred on an antenna of radar apparatus with which said integrator is employed.

2. The integrator of claim 1, wherein the integrator is operable to integrate over successive scans, and operable to output a detection signal on positive detection of a target detection in said window a predetermined number of times.

3. The integrator of claim 2, wherein the integrator is further operable to receive a user input action defining a number of scans over which scan to scan integration is to be performed, the integrator comprising a detection count determining means operable to determine a detection count threshold on the basis of said number of scans, said integrator being operable to output a detection signal on positive detection of a target detection in said window a predetermined number of times at least as great as said detection count threshold.

4. The integrator of claim 3, further comprising target motion estimation means operable to determine an estimated motion of said target relative to radar apparatus with which the scan to scan integrator is to be used, and wherein the window defining means is operable, for each scan, to determine said window on the basis of said target motion estimate.

5. A method for integration of radar detection signals for presentation of radar detection output to a user, the method comprising:

generating a radar detection output on the basis of successful verification of a candidate detection if said candidate detection is confirmed a number of times exceeding a threshold relative to a number of scans to be performed, the step of the candidate detection further comprising the steps of:

defining a rectangular search window relative to a Cartesian reference frame within which to seek the candidate detection, determining a range window within which the candidate detection is to be sought, the range window being bounded by accurate bounds centred on an antenna of radar apparatus with which said method is employed, an intersection of the rectangular search window and of the range window being smaller than each individual window, and if the candidate is detected within the rectangular search window and within the range window, then confirming the candidate detection.

6. The method of claim 5, further comprising the step, in each scan except the initial scan, of determining the range estimate for the scan on the basis of information from the previous scan.

7. The method of claim 5, further comprising receiving a user input action defining a number of scans over which scan to scan integration is to be performed.

8. The method of claim 7, comprising determining a detection count threshold on the basis of said number of scans, and outputting a detection signal on confirmation of a target detection in said window a predetermined number of times at least as great as said detection count threshold.

9. The method of claim 5, wherein the number of scans over which scan to scan integration is to be performed is predetermined.

10. The method of claim 5, further comprising determining an estimated motion of said target relative to radar apparatus in which the method is employed, and determining the window, for each scan, on the basis of said target motion estimate.

* * * * *